(12) United States Patent
Moody, II et al.

(10) Patent No.: US 7,350,114 B2
(45) Date of Patent: **\*Mar. 25, 2008**

(54) MECHANISM FOR ENABLING ENHANCED FIBRE CHANNEL ERROR RECOVERY ACROSS REDUNDANT PATHS USING SCSI LEVEL COMMANDS

(75) Inventors: William H. Moody, II, Austin, TX (US); John F. Tyndall, Austin, TX (US)

(73) Assignee: Crossroads Systems, Inc., Austin, TX (US)

( \* ) Notice: Subject to any disclaimer, the term of this patent is extended or adjusted under 35 U.S.C. 154(b) by 0 days.

This patent is subject to a terminal disclaimer.

(21) Appl. No.: 11/218,134

(22) Filed: Sep. 1, 2005

(65) Prior Publication Data

US 2006/0020846 A1    Jan. 26, 2006

Related U.S. Application Data (63) Continuation of application No. 10/064,436, filed on Jul. 12, 2002, now Pat. No. 7,024,591.

(51) Int. Cl.
*G06F 11/00* (2006.01)
(52) U.S. Cl. .......................... 714/43; 714/748; 714/749
(58) Field of Classification Search ...................... None
See application file for complete search history.

(56) References Cited

U.S. PATENT DOCUMENTS 5,077,656 A    12/1991  Waldron et al.
5,293,576 A     3/1994  Mihm, Jr. et al.
5,315,635 A     5/1994  Kane et al.
5,712,971 A     1/1998  Stanfill et al.
5,917,840 A     6/1999  Cheney et al.
5,940,868 A *   8/1999  Wagner ...................... 711/203
6,105,122 A *   8/2000  Muller et al. .................. 712/1
6,185,203 B1    2/2001  Berman
6,341,315 B1    1/2002  Arroyo et al.

(Continued)

FOREIGN PATENT DOCUMENTS

EP    0 282 682 A2    9/1988

OTHER PUBLICATIONS

Device Driver—http://en.wikipedia.org/wiki/Device_Driver.*

(Continued)

*Primary Examiner*—Yolanda L Wilson
(74) *Attorney, Agent, or Firm*—Sprinkle IP Law Group (57) ABSTRACT

Systems and methods for performing error recovery in a system utilizing redundant communication links. In one embodiment, a host device is coupled to a sequential device such as a tape drive by a pair of Fiber Channel links. The host is configured to associate an identifier with each command. Upon detecting a failure of the transmission of the command via the first link, the host re-transmits the command via the second link. When the link failure is detected, the status of the last command transmitted before the failure is requested. After receiving the status of the command, a request that recovery start (possibly at a point indicated by the status information) is transmitted to the sequential device. If the recovery request is accepted, performance of the command is completed.

26 Claims, 6 Drawing Sheets

U.S. PATENT DOCUMENTS

| | | |
|---|---|---|
| 6,922,804 B2 * | 7/2005 | Das Sharma ............... 714/746 |
| 7,024,591 B2 * | 4/2006 | Moody et al. |
| 2001/0034791 A1 | 10/2001 | Clubb et al. |
| 2002/0065962 A1 * | 5/2002 | Bakke et al. ................. 710/38 |
| 2002/0116564 A1 | 8/2002 | Paul et al. |
| 2003/0172181 A1 | 9/2003 | Sharma |

OTHER PUBLICATIONS

Shim—http://www.answers.com/shim&r=67#after_ad2.*
International Search Report for PCT/US03/21415 Oct 27, 2003.
European Search Report for related EP Application No. 03764399.6 Feb. 10, 2006.

* cited by examiner

MECHANISM FOR ENABLING ENHANCED FIBRE CHANNEL ERROR RECOVERY ACROSS REDUNDANT PATHS USING SCSI LEVEL COMMANDS

CROSS-REFERENCE TO RELATED APPLICATION

This application is a continuation of, and claims a benefit of priority under 35 U.S.C. 120 of the filing date of U.S. patent application Ser. No. 10/064,436 by inventors William H. Moody II and John F. Tyndall entitled "Mechanism for Enabling Enhanced Fibre Channel Error Recovery Across Redundant Paths Using SCSI Level Commands" filed on Jul. 12, 2002, now U.S. Pat. No. 7,024,591 the entire contents of which are hereby expressly incorporated by reference for all purposes.

BACKGROUND OF THE INVENTION

Field of the Invention

The invention relates generally to computer systems and more particularly to systems and methods for performing error recovery following failure of a redundant link connecting a sequential device to a host.

In a stand-alone computer, data is stored in a device such as a hard disk drive. This device is normally internal to the computer and is connected to the CPU by an internal (e.g., PCI) bus. Data delivery on the internal bus is, for the most part, error-free.

In a network environment, however, the data generated by a workstation may be stored on a remote device. In other words, the data storage device is coupled to the workstation by a network that is external to the workstation and is typically coupled to and used by a number of devices other than the workstation and the storage device.

A network is generally more prone to errors than an internal bus since it deals with multiple devices that are contending for use of the network and that are separated by greater distances. Even if there is only a single workstation and a single storage device, there is likely to be a higher error rate than in an internal bus since the network is designed to operate with other devices.

An exemplary system may comprise a workstation (a host) coupled to a storage device in a SAN (Storage Area Network). In this example, the workstation and storage device are each coupled to a Fibre Channel switched fabric. This switched fabric is designed to provide what is referred to as "Class 3" service, which is the class of service typically used in Fibre Channel Protocols. In a network providing Class 3 service, data is multiplexed across switches in the network at frame (packet) boundaries. Class 3 service does not provide for acknowledgement of receipt of frames or notification of a busy destination device. If a frame is dropped, no notice of the dropped frame is provided to its sender. It is simply assumed that this will be accounted for by the host or the sequential device.

This may not be a problem when the data is being stored to a random access device such as a hard disk drive. If data is dropped during a write command, typically the entire sequence is discarded. The sequence can be re-sent, however, by re-issuing the failed SCSI command, and the storage device will simply overwrite any location in which the received portion was previously stored. The portion that was previously stored will be overwritten with the same data, and the portion that was previously dropped will be written to the location where it would have been stored if it had been received on the first transmission.

For sequential storage devices such as tape drives, however, errors may be more problematic. In the same scenario, the portion of the data received on the first attempt will be stored on the tape, and the tape will continue advancing. If the entire sequence is re-sent, the tape drive must be repositioned to the exact same location on the tape at which the data was previously stored. It would be preferable if only the portion of the data that was not received on the first attempt was re-sent. Then, the tape drive could simply continue writing to the tape from the point at which it left off.

It is very difficult in prior art systems, however, to determine which portion of the data was not received on the first attempt. The host device would have to extract information from the port over which the data was first transmitted. The host would then have to interpret the information and convert it into a sequence suitable for transport via the second port. It would therefore be desirable to provide means and/or methods for determining what portion of the data was received on the first attempt without having to extract this information from the first port. Then, the host could deliver only the missing portion of the data to the sequential device, which could then store it after the previously received information.

Tape error recovery in the prior art involves propagation of an error up to the level of the backup application. The result was that the backup application would require a substantial amount of time to perform recovery operations. Alternatively, Fibre Channel Tape Error Recovery as defined in the FC-TAPE and FC-DA technical reports provides a means for hiding errors arising from the loss of data from the backup application.

SUMMARY OF THE INVENTION

One or more of the problems outlined above may be solved by the various embodiments of the invention. Broadly speaking, the invention comprises systems and methods for performing error recovery in a system utilizing redundant communication links. In one embodiment, a host device is coupled to a sequential device such as a tape drive by a pair of Fibre Channel links. Because the Fibre Channel links have a known bit error rate, a packet may occasionally be corrupted. If a packet is corrupted, some error recovery procedure must be performed to ensure that all of the data (e.g., a write command and associated write data) is transmitted to the sequential device. Therefore, upon detecting an error in the transmission of data on the primary Fibre Channel link, the host switches to a secondary link for subsequent transmissions. The host operates cooperatively with the sequential device, re-transmitting the command/data that may have been only partially received due to the link failure. This ensures that the sequential device has complete command/data and can process it as though the first transmission had not failed.

There may be many different embodiments of the present invention. In one embodiment, a method comprises a host associating an identifier with a command, transmitting the command to a sequential device via a first link, detecting a failure of the transmission of the command via the first link and re-transmitting the command via a second link. After detecting the link failure, the status of the last command transmitted before the failure is requested. After receiving the status of the command, a request that recovery start (possibly at a point indicated by the status information) is transmitted to the sequential device. If the recovery request is accepted, performance of the command is completed. In an alternative embodiment, after detecting the link failure, the last command may be re-transmitted by the host, and the responsibility for determining whether all or a portion of the re-transmitted command is redundant is borne by the sequential device. The sequential device then uses the non-redundant information to complete performance of the command.

Another embodiment of the present invention comprises a system having a host device configured to be coupled to a sequential device by a plurality of communication links. The host is configured to transmit commands (and/or data) to the sequential device via a primary one of the links until a failure is detected, then to re-transmit a potentially interrupted command and subsequent commands via a secondary one of the links. The system may be configured to perform error recovery after a failure by having the host re-transmit the potentially interrupted command and having the sequential device identify and discard or ignore information which is redundant to the previously received information. The system may alternatively be configured to distribute the responsibility for performing recovery operations between the host and the sequential device. In some embodiments, a router may be coupled between the host and sequential device and may perform the error recovery operations that would otherwise be carried out by the sequential device.

In another embodiment, an initiator device may connect to a router and transmit a vendor unique command that causes the initiator and the router to count, in parallel, the commands that are transmitted from the initiator to the router. If the primary communication link between the initiator and router fails while the nth command is being executed, the initiator can send a command over a secondary link indicating that recovery should be started with command n. The initiator then re-sends command n and the router can re-execute all or part of command n to complete its execution. Operation (and counting of commands) then continues on the secondary link.

In some embodiments of the invention, the error recovery mechanism may be implemented in software. The software application is embodied in a computer-readable medium such as a floppy disk, CD-ROM, DVD-ROM, RAM, ROM, or the like. The computer readable medium contains instructions which are configured to cause a computer or other data processing system to execute a method which is generally as described above. It should be noted that the computer readable medium may comprise a RAM or other memory which forms part of a data processing system. The computer system would thereby be enabled to perform a method in accordance with the present disclosure and is believed to be within the scope of the appended claims.

Numerous alternative embodiments are also possible.

BRIEF DESCRIPTION OF THE DRAWINGS

Other objects and advantages of the invention may become apparent upon reading the following detailed description and upon reference to the accompanying drawings.

While the invention is subject to various modifications and alternative forms, specific embodiments thereof are shown by way of example in the drawings and the accompanying detailed description. It should be understood, however, that the drawings and detailed description are not intended to limit the invention to the particular embodiment which is described. This disclosure is instead intended to cover all modifications, equivalents and alternatives falling within the scope of the present invention as defined by the appended claims.

DETAILED DESCRIPTION

One embodiment of the invention is described below. It should be noted that this and any other embodiments described below are exemplary and are intended to be illustrative of the invention rather than limiting.

Generally speaking, the invention comprises systems and methods for performing error recovery following failure of a redundant link connecting a sequential device to a host. Command identifiers are associated with each of the commands transmitted from the host to the sequential device over a primary link. The identifier may be explicitly or implicitly associated with the commands. If there is an error in the transmission of a command, the command is re-transmitted over a secondary link. When the command is received, its identifier is compared to one or more of the previously received identifiers to determine whether or not the command was previously transmitted by the host to the sequential device. If the command was not previously transmitted, it is forwarded to the sequential device. If the command was previously transmitted, the redundant portion of the command is discarded, and the command (without any redundant data) is forwarded to the sequential device.

One of the benefits of the present systems and methods is that they may eliminate the need to extract information from the primary link and/or any drivers for the link in order to determine how much data was transmitted successfully to the sequential device. Instead, they may simply provide for detection of a failure of the transmission and re-transmission of the data over the secondary link. Another potential benefit of the present systems and methods is that they take advantage of the redundant links in high availability environments, for which there is increasing demand in the marketplace.

Figure 1:
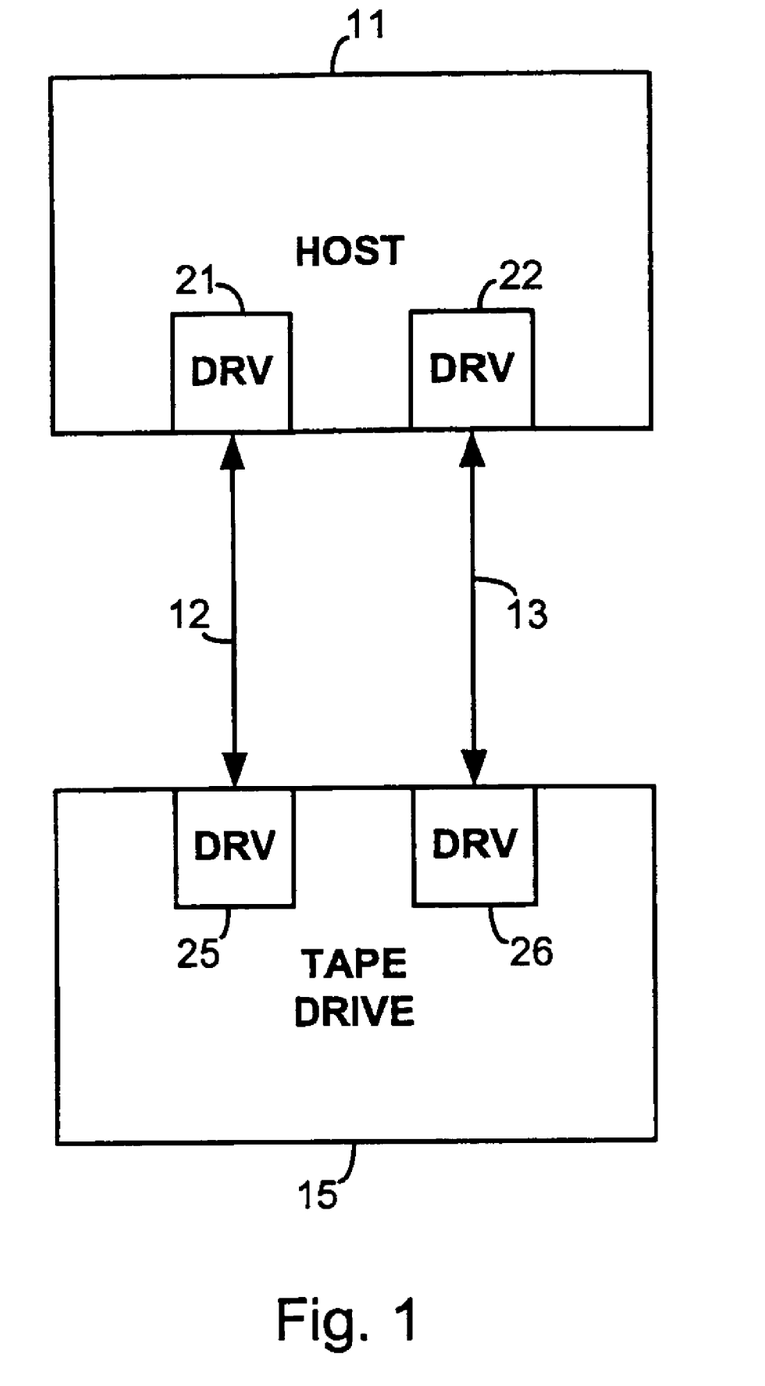
FIG. 1 is a diagram illustrating a system in one embodiment wherein a host is coupled to a sequential device by a pair of communication links, one of which is redundant.

Referring to FIG. 1, one embodiment of the present system is shown. In this embodiment, the host 11 is coupled to a tape drive 15 by a pair of redundant Fibre Channel links 12, 13. Link 12 is coupled to port 21 of host 11 and port 25 of tape drive 15. Link 13 is coupled between port 22 of host 11 and port 26 of tape drive 15. Host 11 is configured to generate SCSI commands and transmit these commands over Fibre Channel links 12, 13 to tape drive 15.

Host 11 generates unique command identifiers corresponding to each of the commands and associates the identifier with the corresponding command. In this embodiment, the identifiers are explicit, but in other embodiments they may be implicit. The command identifier is transmitted along with the command over primary Fibre Channel link 12. When a command is received by tape drive 15, it transmits an acknowledgment back to the host over primary link 12 to notify host 11 that the command was received. If host 11 does not receive an acknowledgment that a particular command was received, that command, and its associated identifier, are re-transmitted to tape drive 15 over secondary Fibre Channel link 13. Tape drive 15 is configured to examine the command identifier received with each command and, if the identifier indicates that the command has already been received, only the non-redundant portion of the command is used. Thus, while some of the information that is transmitted over the Fibre Channel links may be redundant, the portion that is redundant is filtered out before the information is used by tape drive 15.

Figure 2:
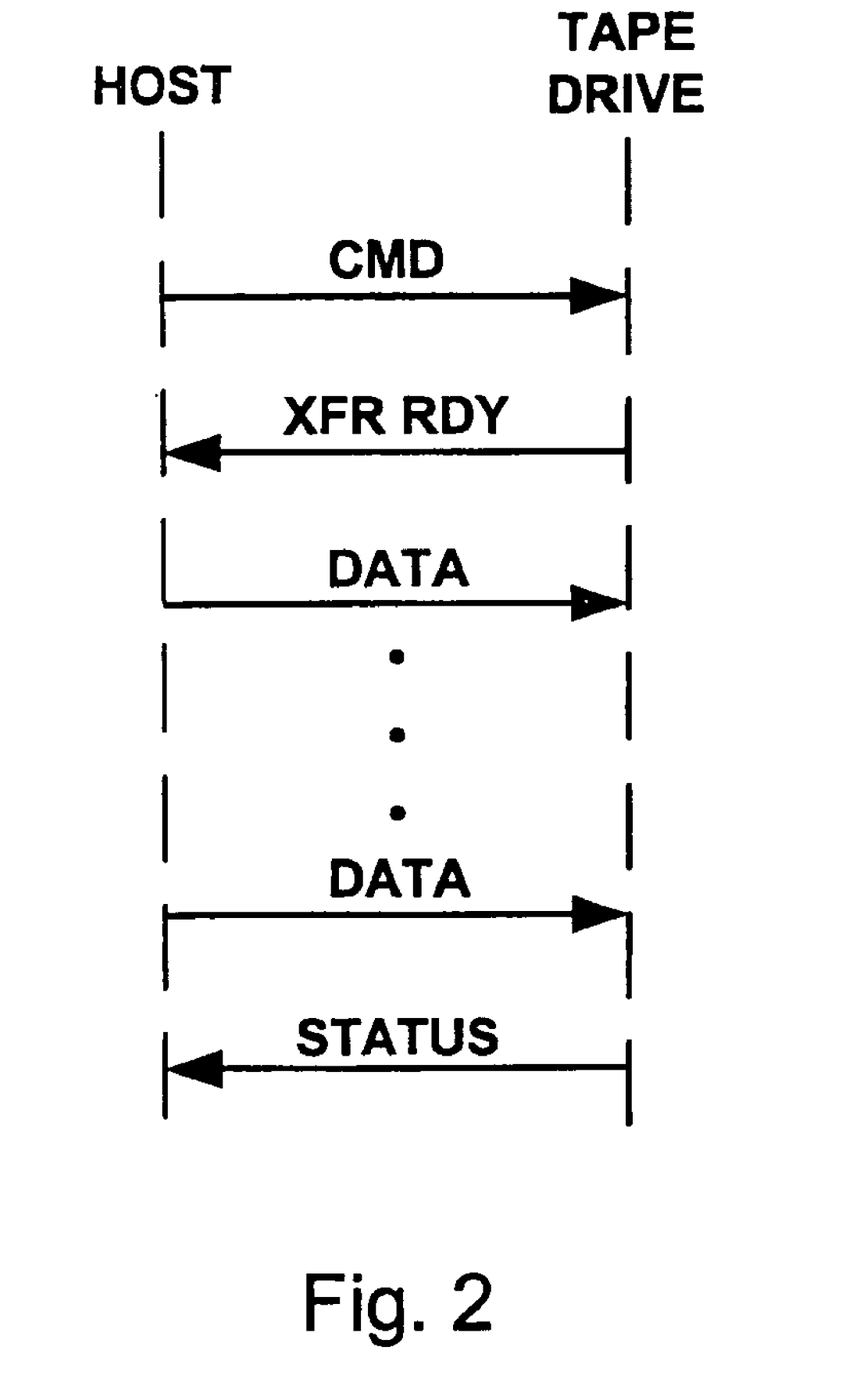
FIG. 2 is a diagram illustrating the exchange of data between a host and a sequential device in one embodiment.

It should be noted that "command" is used herein to refer to a command and any associated data. For example, a write command and the data to be written are both encompassed by the term "command" for the purposes of describing transmission errors between the host and sequential device. Referring to FIG. 2, the exchange of data between a host and a tape drive is illustrated. First, the host transmits the actual command (e.g., "write"). The tape drive responds with a transfer ready (XFR_RDY) message. Then, the data associated with the command (e.g., the data to be written to tape) is transmitted from the host to the tape drive. At the completion of the data transfer from the host to the tape drive, the tape drive sends a status message back to the host. If the status message is not received by the host at the end of this exchange, the transmission of the command (including associated data) is deemed to have failed.

Figure 3:
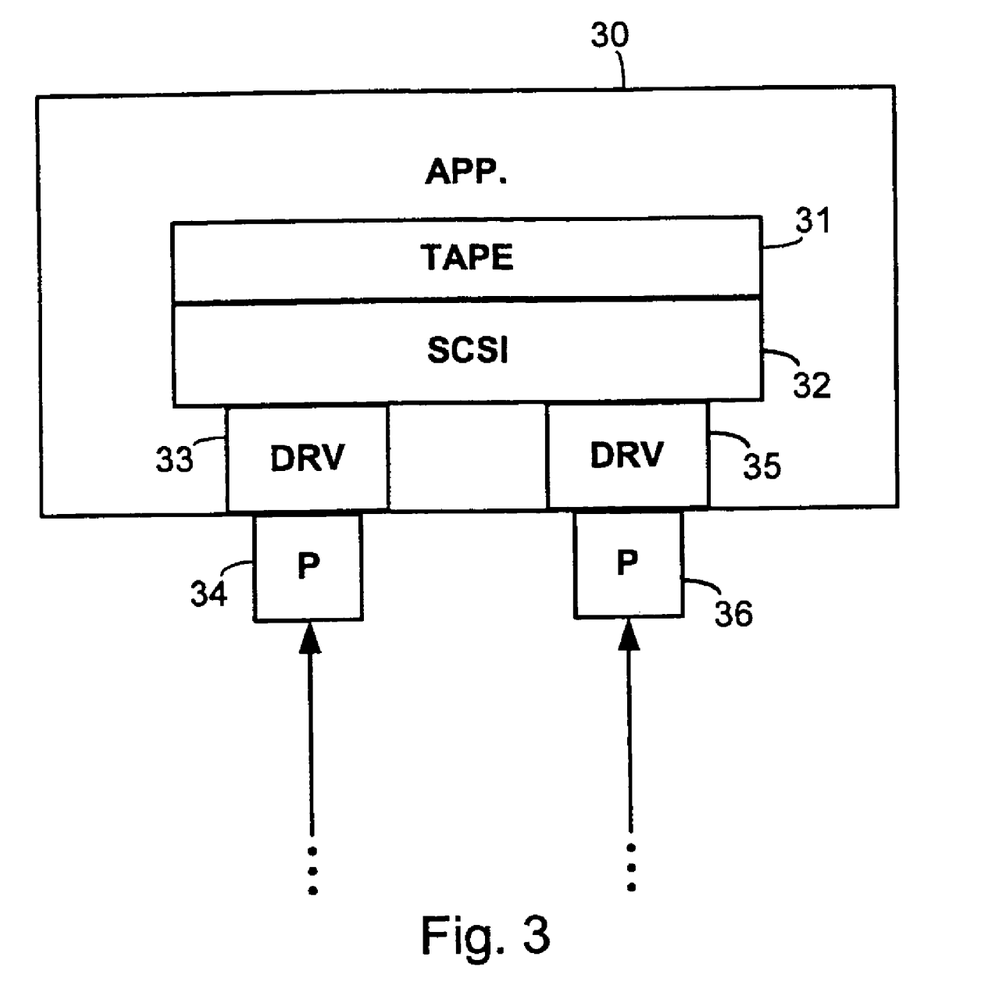
FIG. 3 is a diagram illustrating the structure of an exemplary backup application on a host in one embodiment.

Referring to FIG. 3, a diagram illustrating the structure of a backup application 30 is shown. Backup application 30 is resident on the host device. Backup application 30 is coupled to a tape driver 31 that is designed to control the tape drive. Tape driver 31 is coupled to SCSI driver 32, which is in turn coupled to port drivers 33 and 35 (which are used to drive ports 34 and 36, respectively). SCSI driver 32 generates SCSI commands corresponding to the tape drive commands generated by tape driver 31. Port drivers 33 and 35 generate Fibre Channel-formatted data (corresponding to the SCSI commands) which is transmitted through ports 34 and 36 to their respective Fibre Channel links.

This embodiment makes use of the SCSI level commands to implement an error recovery mechanism that operates across multiple, redundant Fibre Channel links. At a logical level, this mechanism performs essentially the same functions as Fibre Channel Tape Error Recovery as defined in the FC-TAPE and FC-DA technical reports. These FC-TAPE and FC-DA error recovery mechanisms, however, are designed to operate in an environment which utilizes a single Fibre Channel link. The FC-TAPE and FC-DA mechanisms are not designed to take advantage of multiple, redundant Fibre Channel links, and no extension of these mechanisms is defined in the FC-TAPE and FC-DA technical reports.

On a functional level, these two mechanisms differ significantly. The FC-TAPE and FC-DA mechanisms require that sufficient information be extracted from the driver and/or the corresponding link to determine how much of the data was transmitted to the tape drive. This information is propagated up to the level of the port driver, which then processes it to determine which data should be transmitted next. The present mechanism does not require the extraction of this information, but instead transmits data that may be duplicative. If duplicative information is transmitted, the router, tape drive or other receiving device is then given the responsibility of determining the extent to which the associated command was previously executed and utilizing the data to effectively complete execution of the command.

This embodiment of the present mechanism uses SCSI level commands to implement error recovery which is equivalent to Fibre Channel Tape Error Recovery. This embodiment is distinguished by several characteristics: each SCSI command has an associated identification number (which may or may not require the introduction of a new SCSI command); a new SCSI command and response are introduced to ask for and return the status of a specific SCSI command using its associated identification number; a new SCSI command is introduced to request that recovery take place starting at a particular byte within the previous command; and an associated response is introduced to accept or reject the requested recovery operation. The new SCSI commands may initially be implemented as vendor-unique commands, but they may later need to be standardized if the mechanism becomes widespread.

The operation of this embodiment of the error recovery mechanism is illustrated by the following scenario. In this scenario, the host and tape drive are assumed to be as shown in FIG. 1. Host 11 has two FC ports, 21 and 22, and is connected to a tape drive with two FC ports, 25 and 26. Thus, the system has a primary link, 12, and a redundant secondary link, 13 between the host and the tape device. Link 12 is used for all operations until it fails, at which time link 13 takes on all operations. A software driver within the host is aware of the presence of the redundant links. This driver may be the tape driver or a shim driver that fits between the tape driver and the SCSI device driver. As mentioned above, the information exchange between the host and tape drive in this embodiment may be as shown in FIG. 2.

Figure 4:
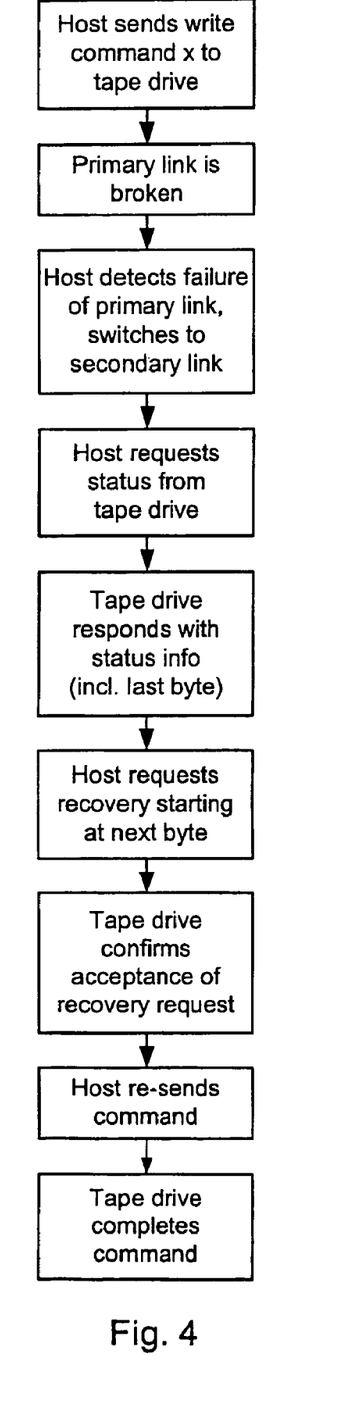
FIG. 4 is a flow diagram illustrating a method in accordance with one embodiment of the present invention.

The sequence of events in this scenario, which is illustrated in FIG. 4, is as follows (the reference numerals for the host, tape drive and links refer to the system depicted in FIG. 1): host 11 is performing a backup operation to tape drive 15 using link 12 (all SCSI commands to the tape drive are given an identification number; and a SCSI LUN identifies the tape drive in use); link 12 is broken during a tape write operation with identification number x; the host driver becomes aware that link 12 has failed and begins using link 13 as a replacement; the host driver uses the new SCSI command, issued over link 13, to request the status of the write operation to the appropriate LUN with identification number x; the tape drive responds with the status that indicates, among other things, the number of data bytes that were actually received; the host driver sends the new SCSI command to request that recovery begin starting at the next data byte after the one last received by the tape drive; the tape drive responds indicating acceptance of the request to begin recovery; the host driver performs a tape write operation using identification number x+1 which writes the remaining data from the original tape write operation that failed.

It should be noted that, prior to the first step, all of the commands are transmitted from the host to the tape drive over the primary link (12). After the primary link fails, all subsequent commands are transmitted over the secondary link (13). It should also be noted that the backup application is not aware of the failure of the primary link in this embodiment.

In the embodiment described above, the host detects the link failure and then requests (via the secondary link) the status of the last command from the tape drive. The tape drive then responds with the status of the transmission. The host then requests that recovery start (at a point indicated by the tape drive in its status reply) and, after the tape drive indicates to the host that the recovery request is accepted, it completes performance of the command. The host and tape drive interact to determine and agree to initial parameters for error recovery operations (e.g., with which byte recovery should begin). In an alternative embodiment, there is little or no interaction between the host and tape drive, other than the transmission of the commands. In this embodiment, the host has the responsibility of detecting the failure of the primary link and re-sending the command being transmitted at the time of the failure. The tape drive has the responsibility of detecting the re-transmission of the same command and filtering out the redundant portion of the command information. This sequence is described below and depicted in FIG. 5.

Figure 5:
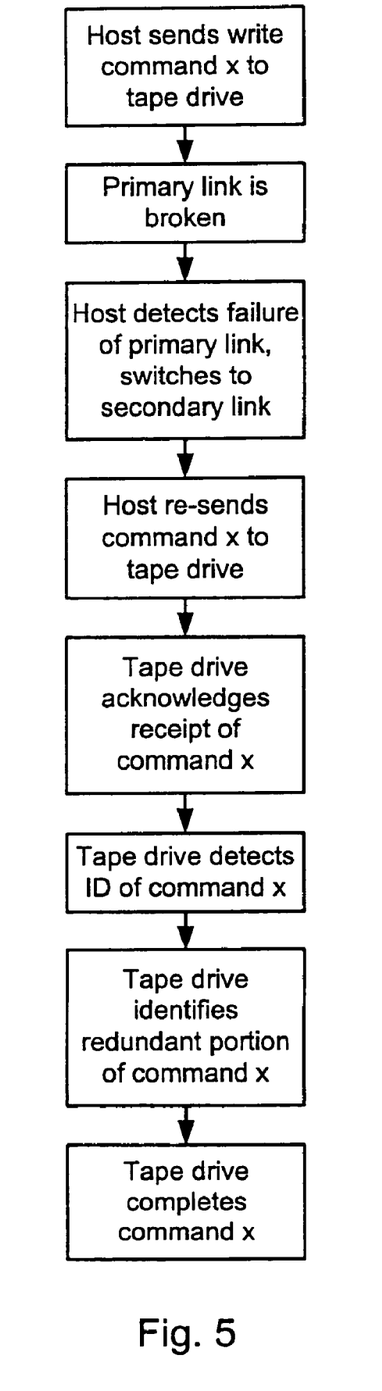
FIG. 5 is a flow diagram illustrating a method in accordance with an alternative embodiment of the present invention.

Host 11 is performing a backup operation to tape drive 15 using link 12 (all SCSI commands to the tape drive are given an identification number; and a SCSI LUN identifies the tape drive in use); link 12 is broken during a tape write operation with identification number x; the host driver becomes aware that link 12 has failed and begins using link 13 as a replacement; the host driver repeats the tape write operation with identification number x; the tape drive responds indicating receipt of the command to perform the tape write operation; the tape drive determines that the tape write operation with identification number x has previously been received; the tape drive identifies the portion of the tape write operation that is redundant and discards it; the tape drive completes the execution of the command (e.g., writes the remaining data from the original tape write operation that failed); A more basic statement of the method employed by the host in the above scenarios is as follows: the host associates an identifier with a command; the host transmits the command via a first link; the host detects a failure of the transmission of the command via the first link; the host re-transmits the command via a second link.

As indicated above, the error recovery following the failure may primarily involve the sequential device (which may be configured to identify the re-transmission and execute the complete command only once), or it may involve both the sequential device and the host (as shown above in the request and return of status information and the request and acceptance of the error recovery request).

In one embodiment, the command identifiers comprise a sequence of incrementing numbers that are explicitly associated with successive commands. For example, the command identifier for a particular command may be 1010. The command identifier for the next command would be 1011. The particular form of the identifier may, however, vary in other embodiments. Since the primary purpose of the identifier is to enable the host and sequential device to ensure that they are handling the same command, the identifier may have any form that allows commands to be uniquely identified. For example, the identifiers may be pseudorandom numbers, alphanumeric strings, or the like. It should also be noted that an identifier may only need to be locally unique. That is, the identifier may only be compared to the identifiers of commands that are sequentially near the failed command. It may therefore be sufficient to utilize a relatively small set of identifiers that is used repetitively. Still further, the identifiers may be implicit, rather than explicit.

In the embodiments described above, the responsibility for generating command identifiers, associating them with corresponding commands and performing other host functions may lie with different components of the host device. It is contemplated that these functions may preferably be performed by the tape driver (see item 31 of FIG. 2) or a shim driver which provides an interface between the tape driver and the SCSI driver. The functions of the sequential device may likewise be located in various components of that device. The functions of the host and sequential device may also be distributed in various ways among the components. In fact, the functions of the sequential device as described above may preferably be located in a router which serves as an interface between the host and the sequential device. In this instance, the error recovery mechanism may be transparent to the sequential device.

As noted above, other embodiments may implicitly associate identifiers with the commands. For example, in one embodiment, an initiator device may connect to a router and transmit a vendor unique command that causes the initiator and the router to count, in parallel, the commands that are transmitted from the initiator to the router. If the primary communication link between the initiator and router fails while the nth command is being executed, the initiator can send a command over a secondary link indicating that recovery should be started with command n. The initiator then re-sends command n and the router can re-execute all or part of command n to complete its execution. Operation (and counting of commands) then continues on the secondary link. This embodiment is illustrated in FIG. 6.

Figure 6:
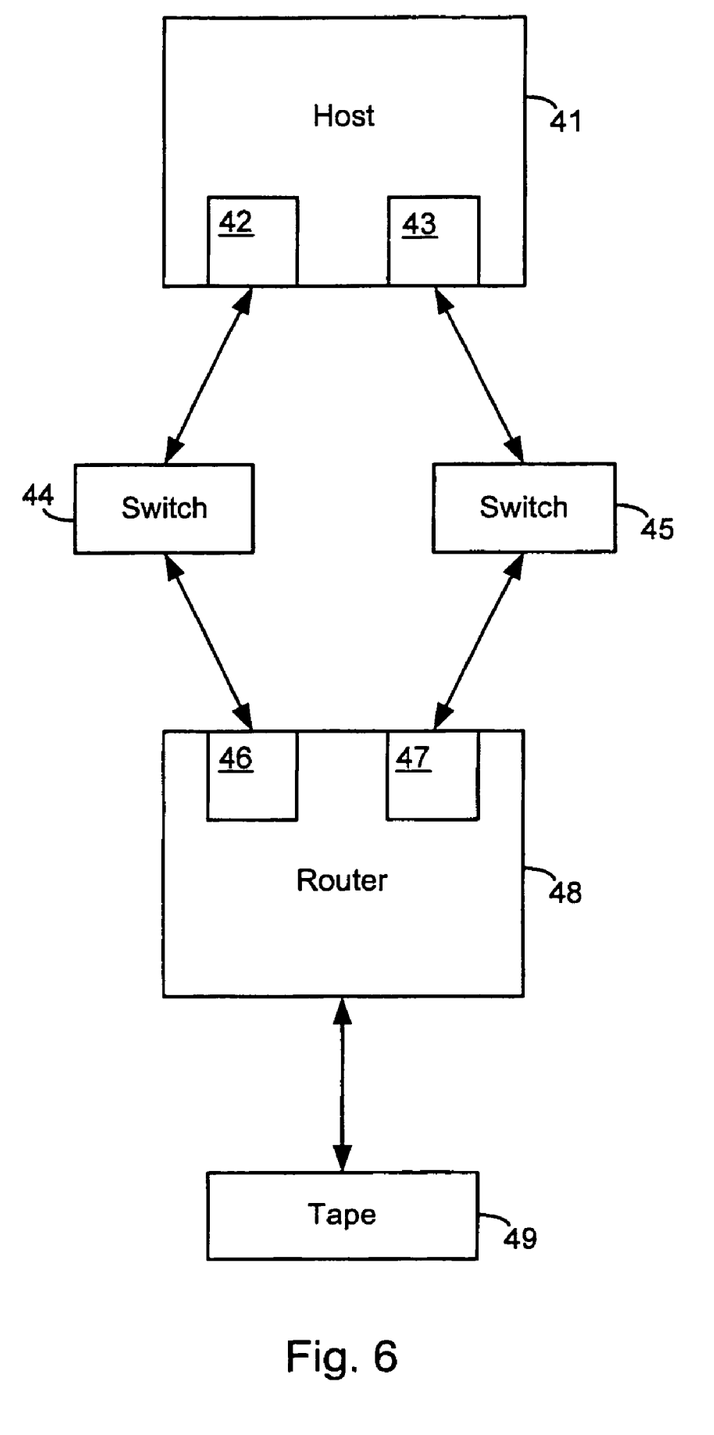
FIG. 6 is a diagram illustrating an embodiment of a system in which the association of identifiers with commands is performed implicitly.

Referring to FIG. 6, a diagram illustrating an initiator device 41 coupled to a router 48 in one embodiment is shown. Initiator device 41 is coupled to router 48 through two separate communication links. The first link is via host bus adapter 42, through switch 44 and to FC port 46. The second link is made via host bus adapter 43, through switch 45 and FC port 47. Commands from initiator 41 are routed to tape backup device 49.

As with the previously described embodiments, this embodiment relies on the association of identifiers (identification numbers, in this instance) with each command so that commands to be recovered can be identified by their associated identifiers. This embodiment also relies on the ability of the router to identify the host from which a given command originates. This can be accomplished, for example, by restricting the availability of the mechanism to a single host at a time.

This embodiment requires the implementation of several new SCSI commands. One of the new commands establishes a new command stream. When this command is issued, a stream is established and associated with the initiator-to-LUN (ITL) nexus. If a non-error response to this command is issued, the new stream (which has a corresponding stream identifier) is established. Another new SCSI command is designed to notify the router that the failure recovery process is being initiated. This command identifies the command stream that is being recovered, associates the command stream with the host that initiates the recovery process and identifies the number of the next command in the stream that will be sent (so that the manner in which the command should be handled can be determined).

When the next command is received, it is handled in one of four ways: If the command can be repeated without negative consequences, it is reissued; if the command was never received, it is handled normally; if the command was completed and the response was not returned to the host, the response is returned to the host; and if the command was partially executed, the router attempts to complete execution of the remainder of the command.

This scheme allows the host to recover from a failure of the primary communication link in the middle of a tape operation (e.g., a backup) without having to propagate notification of the failure up to the host's backup application. The implementation of this mechanism at the SCSI command level eliminates the need for the host bus adapter drivers to participate in the failure recovery process.

The preferred embodiments of the present error recovery mechanism are implemented in systems having a single pair of Fibre Channel links between the host and the sequential device. This mechanism may nevertheless be extendable to systems employing other arrangements of links between the devices. For example, there may be more than two links (a primary and two or more redundant, secondary links) connecting the devices, or the links may be configured to operate according to a protocol other than Fibre Channel.

It should also be noted that, while the foregoing description of the preferred embodiment of the invention focuses on the flow of data from the host to a router, the various embodiments of the invention are applicable to the opposite flow of data (e.g., from a router to a host). In this situation, the router may be required to maintain data in its buffers so that the data can be re-transmitted to the host in the event that an error occurs in the transmission of data from the router to the host. The router would also need to be configured to determine when the data was successfully transmitted (e.g., by detecting an acknowledgment from the host or by timing out).

It should further be noted that the various embodiments of the invention are not limited to data read and data write commands. They may be configured to be operable with other commands (e.g., any SCSI commands). A link failure may occur during any such command. The failure of these commands would be recovered in the same manner as described above—the host switches to the alternate link, it notifies the router that recovery is going to begin with command "x", it re-issues command "x" and operation proceeds. The router then deals with the re-issued command in an appropriate manner, such that the response is the same and the state of the device has not changed.

The benefits and advantages which may be provided by the present invention have been described above with regard to specific embodiments. These benefits and advantages, and any elements or limitations that may cause them to occur or to become more pronounced are not to be construed as a critical, required, or essential features of any or all of the claims. As used herein, the terms "comprises," "comprising," or any other variations thereof, are intended to be interpreted as non-exclusively including the elements or limitations which follow those terms. Accordingly, a process, method, article, or apparatus that comprises a list of elements does not include only those elements but may include other elements not expressly listed or inherent to the claimed process, method, article, or apparatus.

While the present invention has been described with reference to particular embodiments, it should be understood that the embodiments are illustrative and that the scope of the invention is not limited to these embodiments. Many variations, modifications, additions and improvements to the embodiments described above are possible. It is contemplated that these variations, modifications, additions and improvements fall within the scope of the invention as detailed within the following claims.

The invention claimed is:

1. A system comprising:
a host device having two or more ports configured to be coupled to a sequential device via corresponding links, wherein the host device is configured to associate command identifiers with commands, transmit one or more commands via a first link, detect a failure of the first link, request a status of at least one of the one or more commands from the sequential device via a second link, determine a failure associated with completion of a particular command based on the command identifier of that particular command, and transmit at least a portion of the particular command via a second one of the two or more ports.

2. The system of claim 1, wherein the host is configured to make the command identifier explicit in the command.

3. The system of claim 1, wherein the host device is further configured to transmit subsequent commands and corresponding command identifiers via the second one of the two or more ports.

4. The system of claim 1, wherein the links comprise Fibre Channel links.

5. The system of claim 4, wherein the links are configured to provide Class 3 service.

6. The system of claim 1, further comprising a router external to the host device coupled to the links external to the host device to receive the command and command identifier from the host device, wherein the router is configured to be coupled to the sequential device and wherein the host device is further configured to communicate the host identifier for the particular command via the second link.

7. The system of claim 6, wherein the router external to the host device is configured to: identify the command identifier transmitted via the second link as identical to the command identifier for the particular command transmitted via the first link; and forward a portion of the particular command to the sequential device, wherein the forwarded portion of the particular command comprises a portion of the command that was not received by the sequential device via the first link.

8. The system of claim 6, wherein the host is configured to receive an indication of a number of data bytes received by the router in response to requesting the status of the command.

9. The system of claim 8, wherein the host is configured to request that error recovery begin with a next data byte following a last received data byte.

10. The system of claim 8, wherein the host is configured to receive an indication of acceptance to beginning error recovery.

11. The system of claim 1, wherein the host device is configured to receive a number of data bytes of the particular command received in response to requesting the status.

12. The system of claim 11, wherein the host device is configured to request that error recovery begin with a next data byte following a last received data byte.

13. The system of claim 12, wherein the host device is configured to receive an indication of acceptance to beginning error recovery.

14. A method comprising:
associating command identifiers with one or more commands;
transmitting the one or more commands via a first link;
detecting a failure of the first link;
requesting a status of at least one of the one or more commands;
determining a failure associated with a completion of a first command based on the command identifier associated with the first command; and
transmitting at least a portion of the first command via a second link.

15. The method of claim 14, further comprising, prior to transmitting at least a portion of the first command via the second link, receiving the status of execution of the first command, requesting recovery starting at a next byte following a last byte previously received and receiving acknowledgement of acceptance of the recovery request.

16. The method of claim 14, wherein the status indicates a number of bytes of the first command actually received by an external router.

17. The method of claim 14, wherein the status indicates a number of bytes of the first command actually received by a target device.

18. The method of claim 14, further comprising identifying the first command and first command identifier received via the second link, identifying a redundant portion of the first command received via the second link and discarding the redundant portion of the first command.

19. A computer program product having one or more computer readable media with computer readable program code stored thereon, wherein said computer readable program code is configured to cause a device programmed with the program code to perform the method comprising:
- associating a first command identifier with a first command;
- transmitting the first command via a first link;
- detecting a failure of the first link;
- requesting a status for the first command and determining a failure in completion of the first command using the command identifier;
- transmitting at least a portion of the first command and first command identifier via a second link.

20. The computer program product of claim 19, wherein the method is implemented in a host and a router external to the host coupled between the host and a sequential device, wherein associating a first command identifier with a first command comprises the host and the router counting commands transmitted from the host device to the sequential device and associating the count with the corresponding command, and wherein transmitting the first command via a first link, detecting a failure of the first link and transmitting at least a portion of the first command and first command identifier via a second link are performed by the host.

21. The computer program product of claim 20, further comprising initiating transmission of a set of commands to the sequential device by issuing a first command to establish a command stream, wherein the host device and the router are configured to begin counting commands after receiving the first command.

22. The computer program product of claim 19, wherein the method further comprises, requesting recovery starting at a next byte following a last byte previously received and receiving acknowledgement of acceptance of the recovery request.

23. The computer program product of claim 19, wherein the status indicates a number of bytes of the first command actually received.

24. The computer program product of claim 19, wherein the method is implemented in a device driver.

25. The computer program product of claim 19, wherein the method is implemented in a shim driver between a device driver and a command driver.

26. The computer program product of claim 25, wherein the command driver comprises a SCSI driver.

* * * * *